(12) United States Patent
Truscott et al.

(10) Patent No.: US 10,220,561 B2
(45) Date of Patent: Mar. 5, 2019

(54) EXTRUSION DEVICE AND METHOD OF USE

(71) Applicant: NORDSON CORPORATION, Westlake, OH (US)

(72) Inventors: Michael K. Truscott, Chippewa Falls, WI (US); Stefan Wöstmann, Sassenberg (DE)

(73) Assignee: Nordson Corporation, Westlake, OH (US)

( * ) Notice: Subject to any disclaimer, the term of this patent is extended or adjusted under 35 U.S.C. 154(b) by 666 days.

(21) Appl. No.: 14/703,069

(22) Filed: May 4, 2015

(65) Prior Publication Data

US 2016/0325476 A1    Nov. 10, 2016

(51) Int. Cl.

| | |
|---|---|
| *B29C 47/12* | (2006.01) |
| *B29C 47/06* | (2006.01) |
| *B29C 47/00* | (2006.01) |
| *B29C 47/08* | (2006.01) |
| *B29C 47/14* | (2006.01) |
| *B29C 47/56* | (2006.01) |

(52) U.S. Cl.
CPC ........ *B29C 47/124* (2013.01); *B29C 47/0009* (2013.01); *B29C 47/065* (2013.01); *B29C 47/0816* (2013.01); *B29C 47/128* (2013.01); *B29C 47/145* (2013.01); *B29C 47/0021* (2013.01); *B29C 47/0026* (2013.01); *B29C 47/56* (2013.01)

(58) Field of Classification Search
CPC . B29C 47/124; B29C 47/145; B29C 47/0816; B29C 47/0009; B29C 47/065; B29C 47/128; B29C 47/0026; B29C 47/0021; B29C 47/56
See application file for complete search history.

(56) References Cited

U.S. PATENT DOCUMENTS

| | | | |
|---|---|---|---|
| 3,886,963 A | | 6/1975 | Jones et al. |
| 3,918,865 A | | 11/1975 | Nissel |
| 3,924,990 A | * | 12/1975 | Schrenk .............. B29C 47/0021 |
| | | | 425/131.1 |
| 4,164,956 A | | 8/1979 | Takahashi et al. |
| 4,249,875 A | | 2/1981 | Hart et al. |
| 4,483,669 A | | 11/1984 | Hahn |

(Continued)

FOREIGN PATENT DOCUMENTS

| | | |
|---|---|---|
| GB | 1410777 A | 10/1975 |
| WO | 2015/044959 A1 | 4/2015 |

OTHER PUBLICATIONS

European Application No. 16164924.9: European Search Report dated Oct. 5, 2016, 8 pages.

(Continued)

*Primary Examiner* — Robert J Grun
(74) *Attorney, Agent, or Firm* — Baker & Hostetler LLP

(57) ABSTRACT

The invention provides an extrusion device having an adjustment valve that is rotatable between first and second operative positions. The extrusion device is configured to produce a first layer arrangement when the adjustment valve is in the first operative position and to produce a second layer arrangement when the adjustment valve is in the second operative position. Also provided are methods of using an extrusion device to produce different layer arrangements.

11 Claims, 8 Drawing Sheets

(56) References Cited

U.S. PATENT DOCUMENTS

| | | |
|---|---|---|
| 4,931,246 A | 6/1990 | Kudert et al. |
| 5,076,777 A | 12/1991 | Schmitt |
| 5,110,276 A | 5/1992 | Farnsworth et al. |
| 5,616,350 A | 4/1997 | Wissmann et al. |
| 5,711,349 A | 1/1998 | Wissmann |
| 5,858,420 A | 1/1999 | Szajak et al. |
| 6,174,478 B1 | 1/2001 | Silver |
| 7,384,259 B2 | 6/2008 | Prue |
| 8,490,643 B2 | 7/2013 | Hanson et al. |
| 9,327,441 B2 | 5/2016 | Ulcej et al. |
| 2004/0159964 A1 | 8/2004 | Lavoie et al. |
| 2004/0213983 A1 | 10/2004 | Nodono et al. |
| 2007/0184142 A1 | 8/2007 | Prue |
| 2012/0073687 A1 | 3/2012 | Hanson et al. |
| 2013/0224321 A1* | 8/2013 | Eloo ................... B29B 9/06 425/145 |
| 2015/0001755 A1* | 1/2015 | Abe ................... B29B 7/748 264/78 |
| 2016/0031145 A1 | 2/2016 | Truscott |
| 2016/0223090 A1 | 8/2016 | G. R. |
| 2016/0243743 A1* | 8/2016 | Hanson ............... B29C 47/0811 |
| 2016/0325476 A1 | 11/2016 | Truscott |

OTHER PUBLICATIONS

European Patent Application No. 16164924.9; Extended Search Report; dated Jan. 13, 2017; 12 pages.
European Patent Application No. 17195711.1; Extended Search Report; dated Feb. 15, 2018; 5 pages.
European search opinion dated Jan. 13, 2017 for EP Application No. 16164924.

* cited by examiner

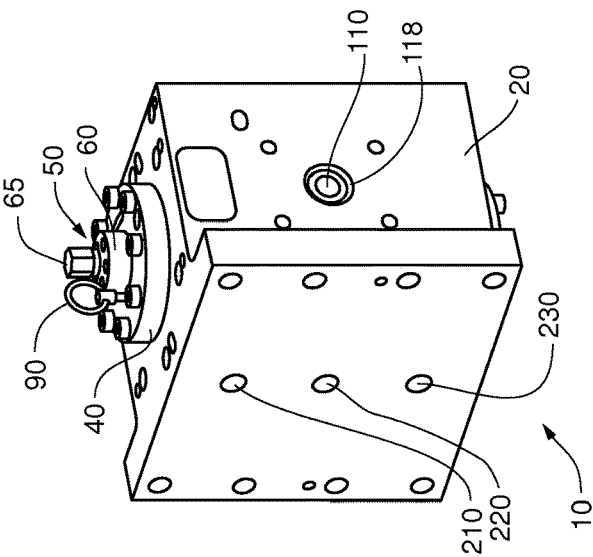
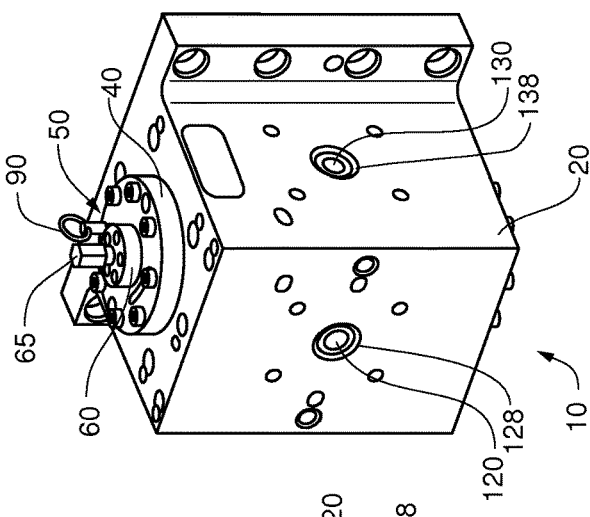
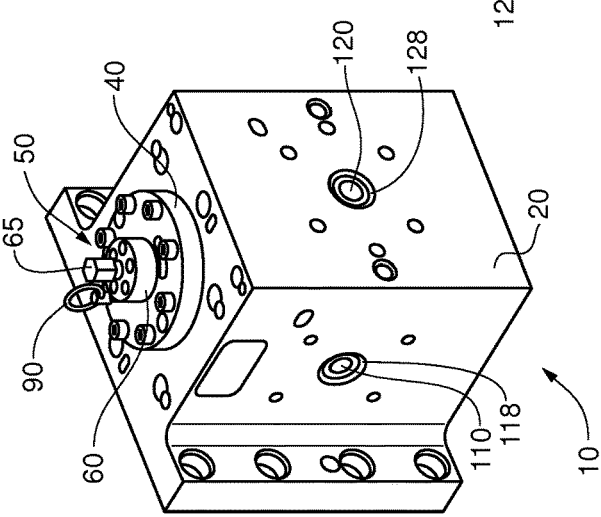

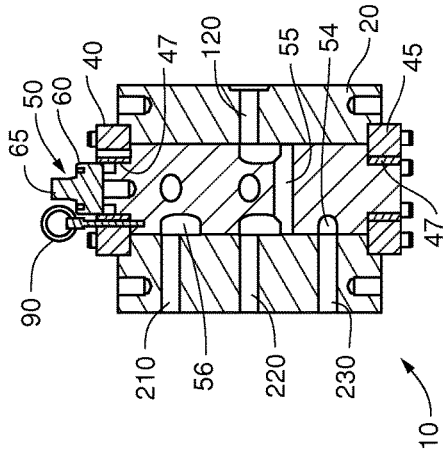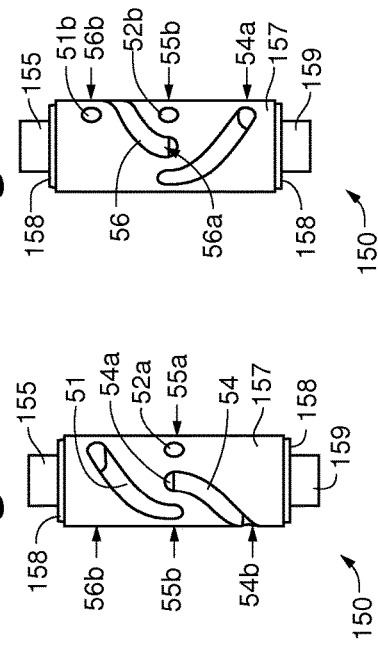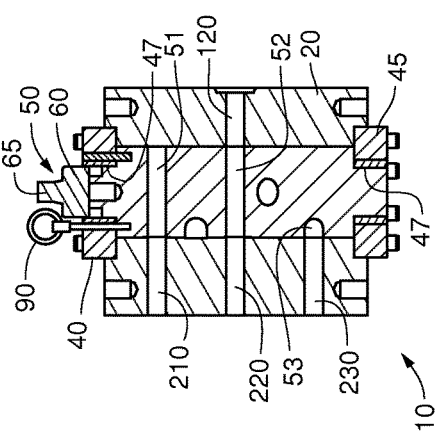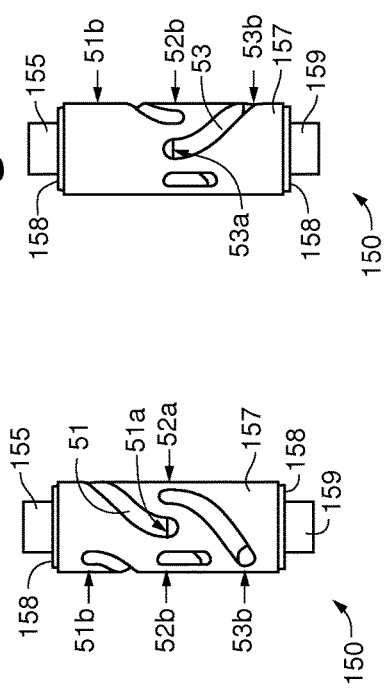

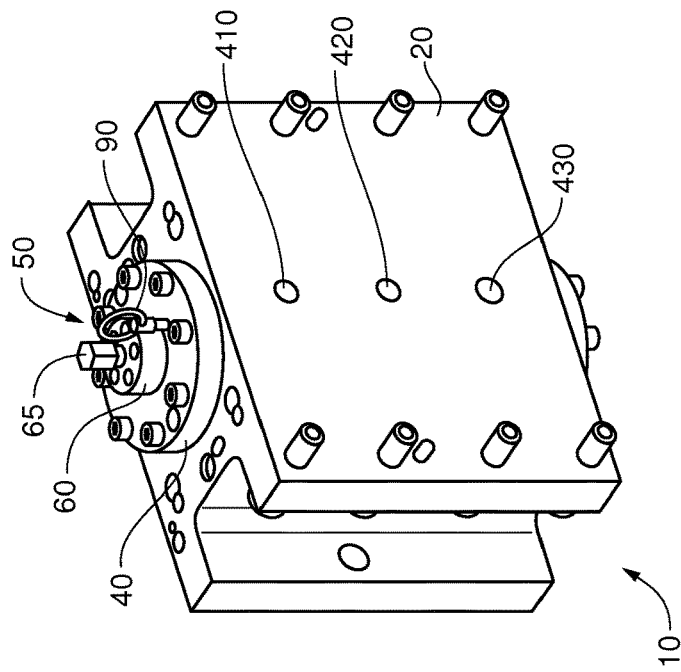
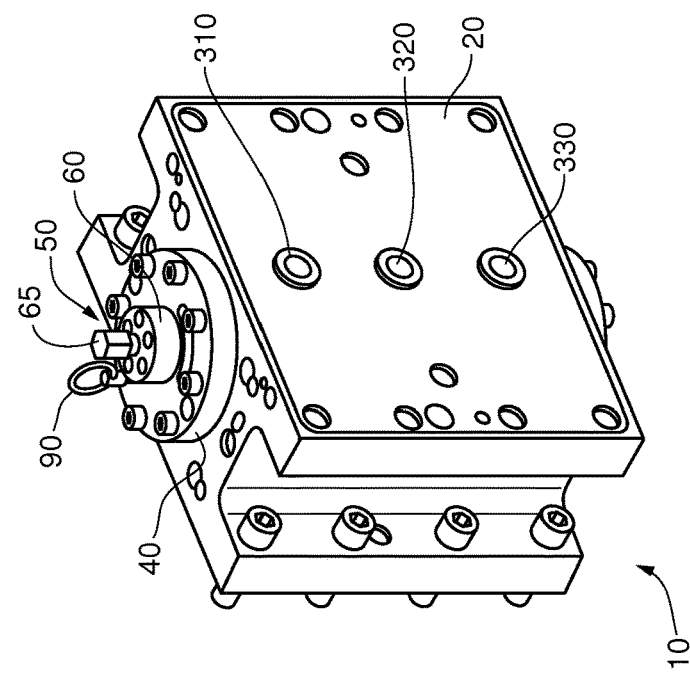

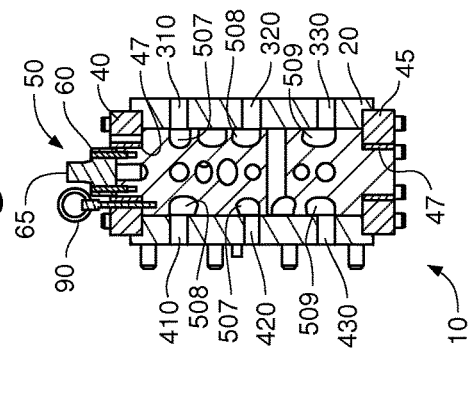
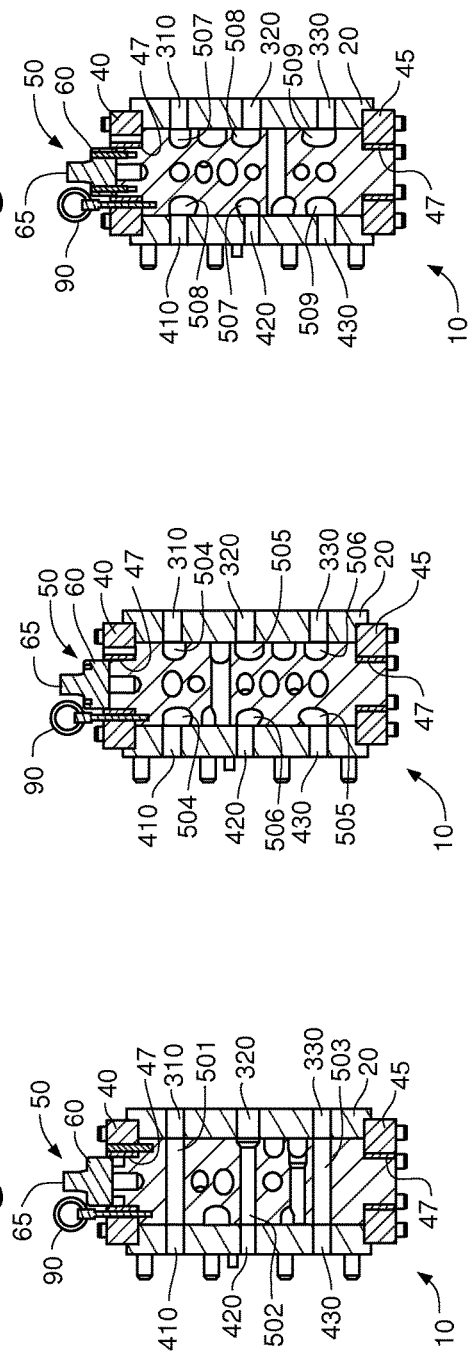
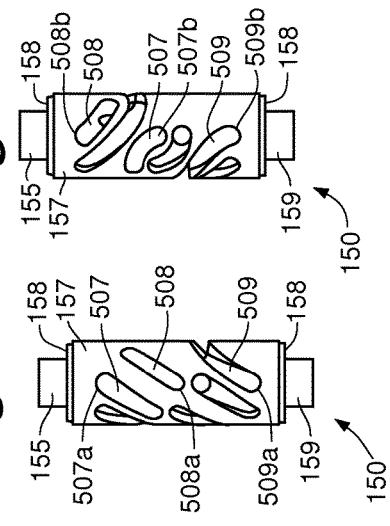
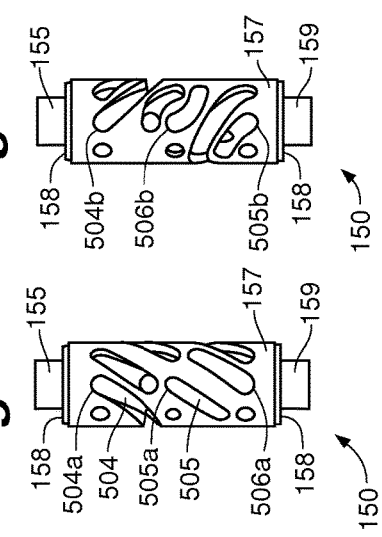
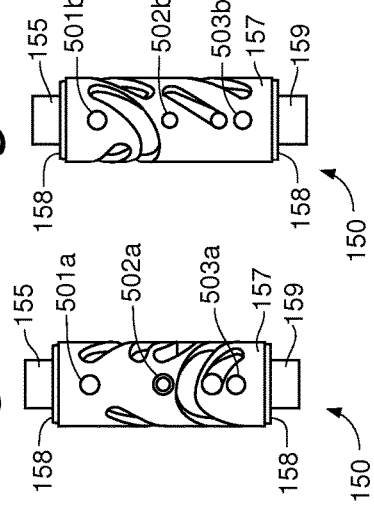

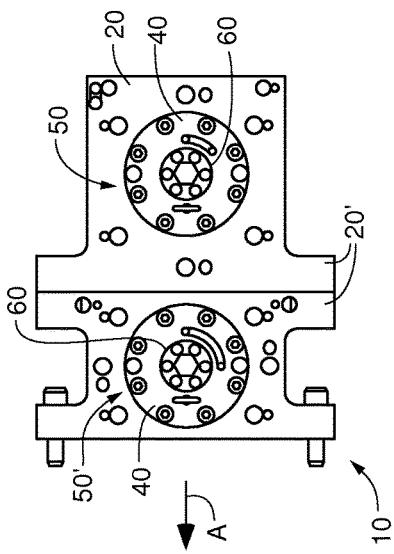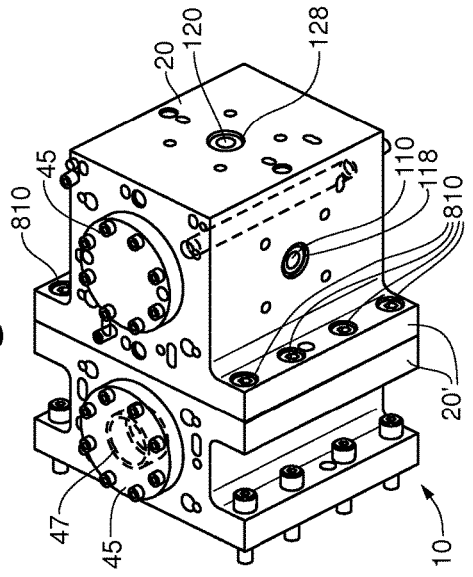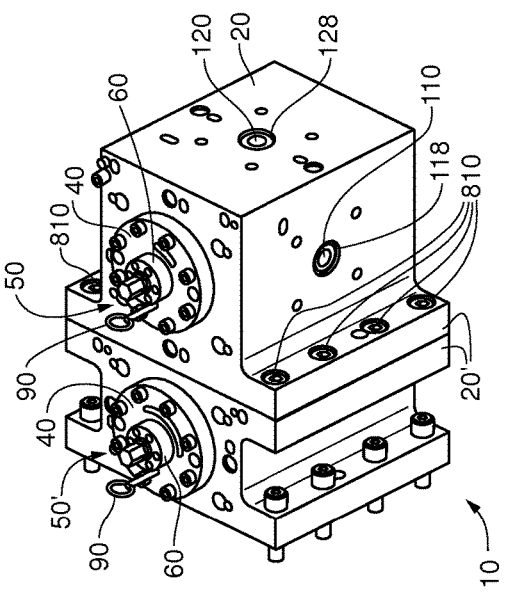

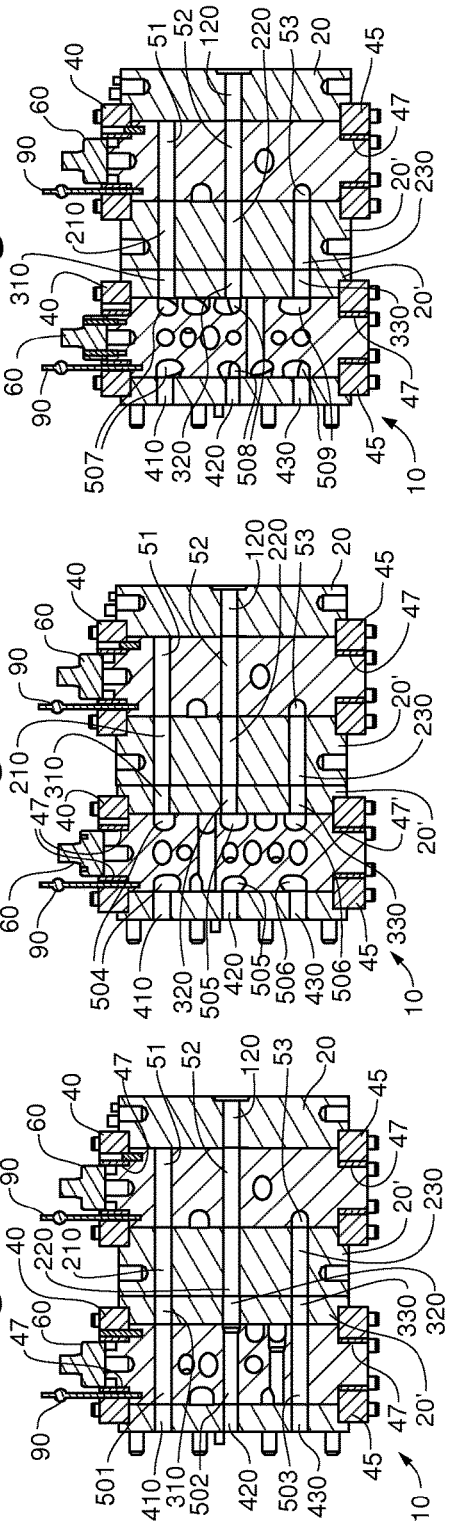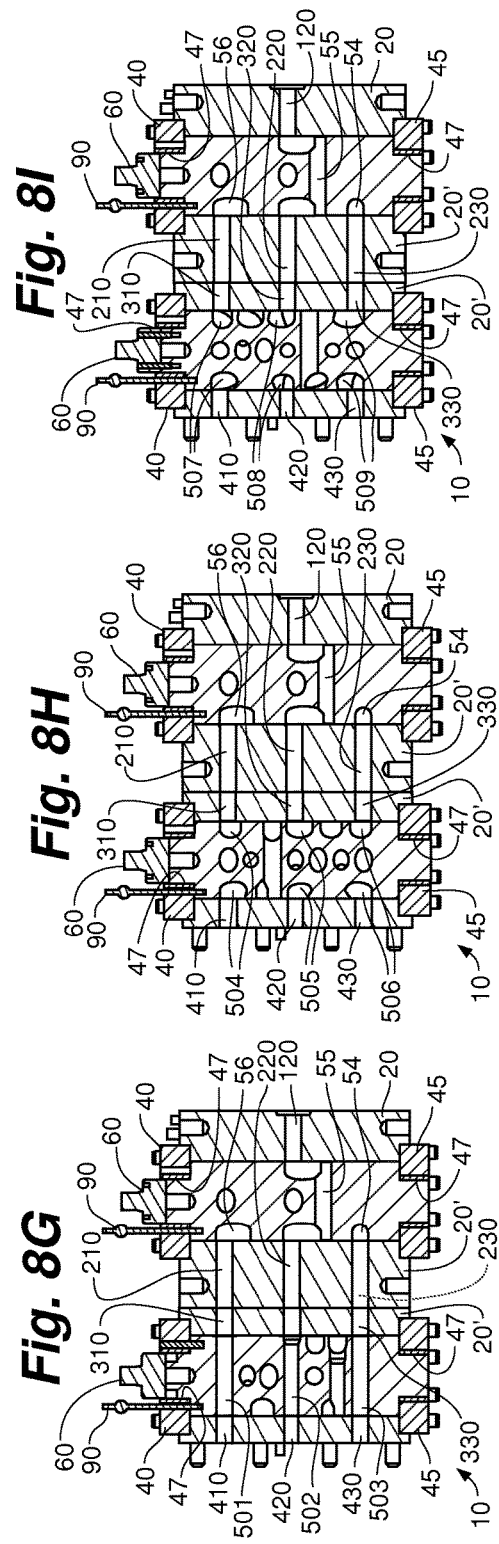

and an adjustment valve. The adjust-

EXTRUSION DEVICE AND METHOD OF USE

FIELD OF THE INVENTION

The invention relates generally to extrusion devices. More specifically, the invention relates to coextrusion devices.

BACKGROUND OF THE INVENTION

A coextrusion feedblock can be used to bring together molten streams of thermoplastic materials from multiple extruders. Individual streams from different extruders can be brought together in the coextrusion feedblock to form a particular layer structure. The resulting multi-layer extrudate flow can then be delivered to a subsequent extrusion die, or another downstream tool, to produce the desired multiple layer extrudate.

In the case of a coextrusion feedblock adapted for producing 3-layer structures, the feedblock may initially be set-up for producing an A/B/C layer structure. If the operator later wishes to produce an A/C/B layer structure, for example, then with conventional feedblocks, it is first necessary to shut down the line and replace components, such as flow inserts, diverters, plugs, flow spools, and/or selector plates. Significant downtime results from replacing such parts and restringing the line for the new layer structure. This downtime can be on the order of hours.

It would be desirable to provide a coextrusion device that can be readily configured to produce different layer structures. It would be particularly desirable to provide a device that can be reconfigured without having to shut down the extruder(s), disassemble the device, or both. It would also be particularly desirable to provide a device that has reliable dynamic sealing when adjusted from one configuration to the next.

BRIEF DESCRIPTION OF THE DRAWINGS

The following drawings are illustrative of particular embodiments of the invention and do not limit the scope of the invention. The drawings are not necessarily to scale and are intended for use in conjunction with the explanations provided in the following detailed description. Embodiments of the invention will hereinafter be described in connection with the appended drawings, wherein like numerals denote like elements.

FIG. 1A is a perspective view of an extrusion device in accordance with one embodiment of the present invention.

FIG. 1B is another perspective view of the extrusion device of FIG. 1.

FIG. 1C is a still another perspective of the extrusion device of FIG. 1.

FIG. 2A is a cross-sectional view of the extrusion device of FIG. 1, with an adjustment valve shown in a first configuration such that the extrusion device is configured to produce extrudate having a first layer structure.

FIG. 2B is a left side view of a spool of the adjustment valve of FIG. 2A.

FIG. 2C is a right side view of the spool of the adjustment valve of FIG. 2B.

FIG. 3A is a cross-sectional view of the extrusion device of FIG. 1, with the adjustment valve shown in a second configuration such that the extrusion device is configured to produce extrudate having a second layer structure.

FIG. 3B is a left side view of the spool of the adjustment valve of FIG. 3A.

FIG. 3C is a right side view of the spool of the adjustment valve of FIG. 3A.

FIG. 4A is a perspective view of an extrusion device in accordance with another embodiment of the invention.

FIG. 4B is another perspective view of the extrusion device of FIG. 4A.

FIG. 5A is a cross-sectional view of the extrusion device of FIG. 4A, with an adjustment valve shown in a first configuration such that the extrusion device is configured to produce extrudate having a first layer structure.

FIG. 5B is a front view of a spool of the adjustment valve of FIG. 5A.

FIG. 5C is a rear view of the spool of the adjustment valve of FIG. 5A.

FIG. 6A is a cross-sectional view of the extrusion device of FIG. 4A, with the adjustment valve shown in a second configuration such that the extrusion device is configured to produce extrudate having a second layer structure.

FIG. 6B is a front view of a spool of the adjustment valve of FIG. 6A.

FIG. 6C is a rear view of a spool of the adjustment valve of FIG. 6A.

FIG. 7A is a cross-sectional view of the extrusion device of FIG. 4A, with the adjustment valve shown in a second configuration such that the extrusion device is configured to produce extrudate having a second layer structure.

FIG. 7B is a front view of a spool of the adjustment valve of FIG. 7A.

FIG. 7C is a rear view of a spool of the adjustment valve of FIG. 7A.

FIG. 8A is a top view of an extrusion device in accordance with still another embodiment of the invention.

FIG. 8B is a perspective view of the extrusion device of FIG. 8A.

FIG. 8C is another perspective view of the extrusion device of FIG. 8A.

FIG. 8D is a cross-sectional view of the extrusion device of FIG. 8A, with an adjustment valve shown in a first configuration such that the extrusion device is configured to produce extrudate having a first layer structure.

FIG. 8E is a cross-sectional view of the extrusion device of FIG. 8A, with an adjustment valve shown in a second configuration such that the extrusion device is configured to produce extrudate having a second layer structure.

FIG. 8F is a cross-sectional view of the extrusion device of FIG. 8A, with an adjustment valve shown in a third configuration such that the extrusion device is configured to produce extrudate having a third layer structure.

FIG. 8G is a cross-sectional view of the extrusion device of FIG. 8A, with an adjustment valve shown in a fourth configuration such that the extrusion device is configured to produce extrudate having a fourth layer structure.

FIG. 8H is a cross-sectional view of the extrusion device of FIG. 8A, with an adjustment valve shown in a fifth configuration such that the extrusion device is configured to produce extrudate having a fifth layer structure.

FIG. 8I is a cross-sectional view of the extrusion device of FIG. 8A, with an adjustment valve shown in a sixth configuration such that the extrusion device is configured to produce extrudate having a sixth layer structure.

SUMMARY OF THE INVENTION

Figure 9:
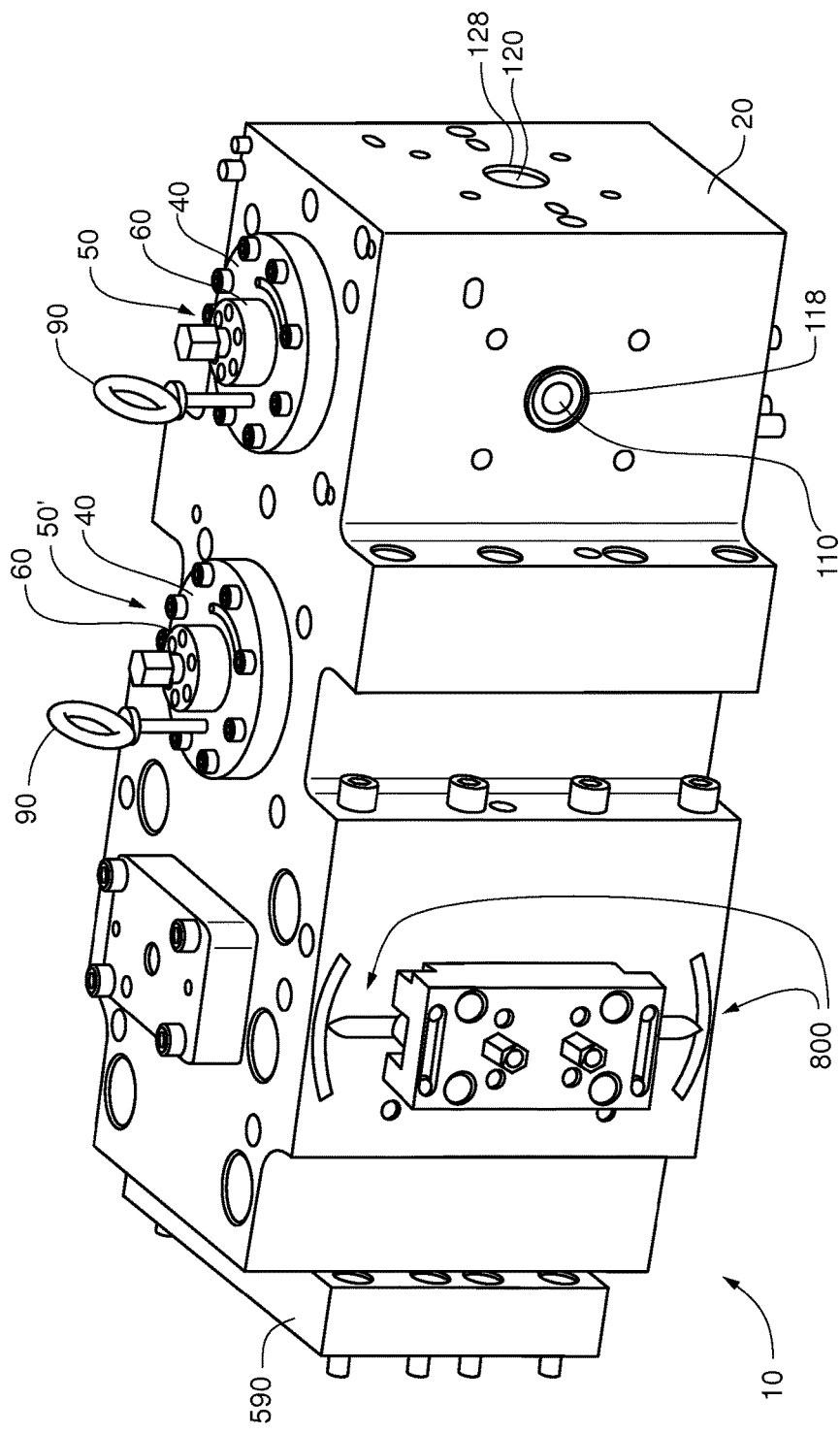
FIG. 9 is a perspective view of an extrusion device in accordance with yet another embodiment of the invention.

In one embodiment, the invention provides an extrusion device having a body and an adjustment valve. The adjustment valve is rotatable between first and second operative positions. The extrusion device is configured to produce a first layer arrangement when the adjustment valve is in the first operative position, and the extrusion device is configured to produce a second layer arrangement when the adjustment valve is in the second operative position. The first and second layer arrangements are different.

In another embodiment, the invention provides a method of using an extrusion device to produce different layer arrangements. The extrusion device comprises a body and an adjustment valve. The method comprises: (i) operating the extrusion device, while the adjustment valve is in a first operative position, to produce a first layer arrangement, and (ii) rotating the adjustment valve from the first operative position to a second operative position, and (iii) operating the extrusion device, while the adjustment valve is in the second operative position, to produce a second layer arrangement. The first and second layer arrangements are different.

DETAILED DESCRIPTION OF PREFERRED EMBODIMENTS

The following detailed description is exemplary in nature and is not intended to limit the scope, applicability, or configuration of the invention in any way. The description provides practical illustrations for implementing certain preferred embodiments of the invention. Examples of constructions, materials, dimensions, and manufacturing processes are provided for selected elements; all other elements employ that which is known to those of ordinary skill in the field of the invention. Those skilled in the present art will recognize that many of the given examples have a variety of suitable alternatives.

The invention provides an extrusion device 10 that is adjustable between first and second output configurations. The extrusion device 10, when in the first output configuration, produces extrudate having a first layer arrangement, and when in the second output configuration, produces extrudate having a second layer arrangement. In some cases, the extrusion device 10 has only two output configurations (or "settings"). Reference is made to the embodiment of FIGS. 1A-3C. In other cases, the extrusion device 10 has three or more output configurations, each adapted to produce a unique extrudate layer arrangement. Reference is made to the embodiment of FIGS. 4A-7C. Depending upon the number of different layer arrangements the extrusion device is intended to produce, it can have six or more output configurations. FIGS. 8A-8I and FIGS. 9-10 respectfully depict two embodiments wherein the extrusion device 10 has six different output configurations. Thus, it is capable of producing six different extrudate layer arrangements. Depending upon the range of layer arrangements desired, the extrusion device can have more than six output configurations.

In the embodiments illustrated, the output configuration of the extrusion device 10 can be changed without having to shut down the extrusion line. For example, one or more extruders delivering multiple polymer flows to the extrusion device 10 can continue operating while the layer arrangement produced by the device is changed. The extrusion device 10 can optionally be adjustable (e.g., from being configured to produce extrudate having a first layer arrangement to being configured to produce extrude having a second layer arrangement) without having to remove any component and replace it with a different component. More generally, the extrusion device 10 can optionally be adjustable between different output configurations without having to disassemble any portion of the extrusion device (or at least no portion exposed to a flow path).

The extrusion device 10 can be a coextrusion feedblock, a flow arranger located upstream of a feedblock, or any other device in which it would be desirable to change the arrangement of layers output from the device.

Figure 10:
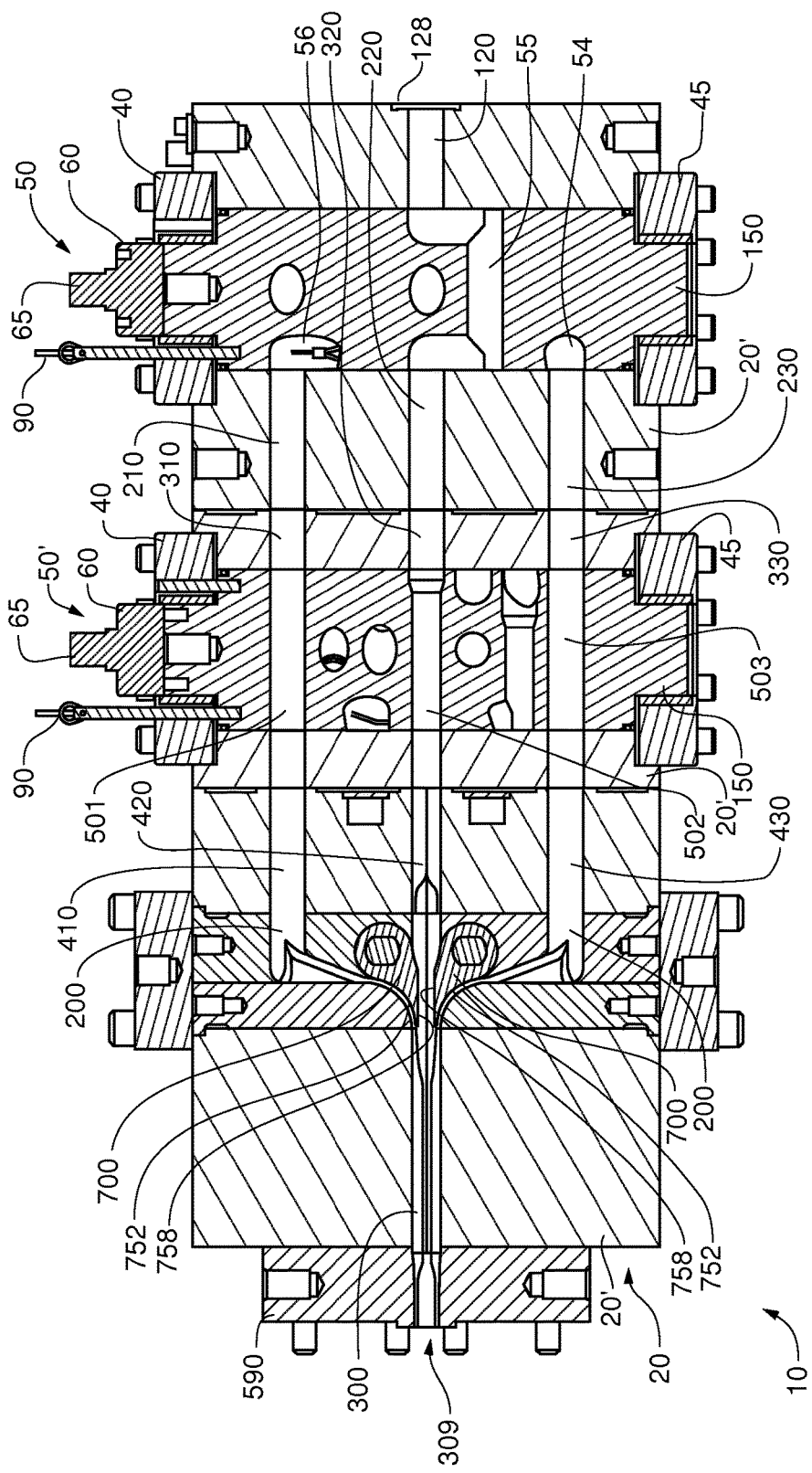
FIG. 10 is a cross-sectional view of the extrusion device of FIG. 9.

The extrusion device 10 has a body 20 and an adjustment valve 50. The body 20 can be provided in different shapes and forms. In FIGS. 1A-1C and 4A-4B, the body 20 is a single block. The same is true of the body 20 in FIGS. 4A and 4B. The body 20 can alternatively comprise multiple blocks. For example, the body 20 of the extrusion device 10 shown in FIGS. 8A-8I comprises two blocks 20', 20'. In FIGS. 9 and 10, the body 20 of the extrusion device 10 comprises three blocks 20', 20', 20', as is best seen in FIG. 10. As shown in FIGS. 8B and 8C, the blocks can be joined together by a plurality of fasteners (e.g., bolts) 810.

The body 20 has first 118 and second 128 inputs adapted to respectively receive first and second polymer flows from first and second extruders. The adjustment valve 50 can be rotated between first and second operative positions while the first and second extruders continue delivering first and second polymer flows to the first 118 and second 128 inputs of the body 20. Thus, the output can be changed without having to turn off the extruders. In the embodiments illustrated, the body 20 has first 118, second 128, and third 138 inputs adapted to respectively receive first, second, and third polymer flows (e.g., from first, second, and third extruders). If desired, the body 20 can be provided with inputs to receive polymer flows from four or five, or even more, extruders.

It is to be appreciated that the inputs can be provided at various different locations on the body 20 of the extrusion device 10. Moreover, a single inlet can alternatively be provided to supply polymer to one or more flow lines of the extrusion device.

Thus, the extrusion device 10 has a body 20 and an adjustment valve 50, which is rotatable between first and second operative positions. The rotational adjustment system of the present extrusion device 10 provides exceptional dynamic sealing. It also enables a particularly compact device profile.

When the adjustment valve 50 is in the first operative position, the extrusion device 10 is configured to produce extrudate having a first layer arrangement. When the adjustment valve 50 is in the second operative position, the extrusion device 10 is configured to produce extrudate having a second layer arrangement. The first and second layer arrangements are different. For example, the first layer arrangement can be an "AB" layer arrangement, while the second layer arrangement is a "BA" layer arrangement. In the present disclosure, "A" refers to a layer formed by a first polymer flow (e.g., from a first extruder), while "B" refers to a layer formed by a second polymer flow (e.g., from a second extruder). Layer A will commonly have a different composition than layer B. For example, layers A and B may be formed of different polymers. In some cases, layer A will be one color while layer B is another color.

Referring to the embodiments of FIGS. 1A-3C and 4A-7C, the body 20 of the extrusion device 10 has a plurality of intake conduits 110, 120, 130 or 310, 320, 330 and a plurality of output conduits 210, 220, 230 or 410, 420, 430. In the embodiments illustrated, the body 20 has the same number "n" of (e.g., two or more, optionally three) intake conduits and output conduits, and the adjustment valve has the same number "n" of (not more) active extrudate channels. Thus, at any given time during operation, there can be "n" active extrudate channels in the adjustment valve, and at least "n" (optionally at least "2n") closed extrudate channels in the adjustment valve. The active extrudate channels are open to the respective intake conduits of the body 20, while the closed extrudate channels are blocked off at both ends by confronting interior surfaces of the body (such that during operation, no extrudate can be flowed through the closed extrudate channels).

The adjustment valve 50 has first and second sets of extrudate channels 51, 52, 53 and 54, 55, 56 or 501, 502, 503 and 504, 505, 506. When the adjustment valve 50 is in the first operative position, the first set of extrudate channels 51, 52, 53 or 501, 502, 503 is open to the intake conduits and to the output conduits, while the second set of extrudate channels 54, 55, 56 or 504, 505, 506 is closed off from the intake conduits and from the output conduits. When the adjustment valve 50 is in the second operative position, the second set of extrudate channels 54, 55, 56 or 504, 505, 506 is open to the intake conduits and to the output conduits, while the first set of extrudate channels 51, 52, 53 or 501, 502, 503 is closed off from the intake conduits and from the output conduits.

In the embodiments illustrated, the adjustment valve 50 comprises a spool 150 and a lock 90. The spool 150 is rotatable and is shown having a cylindrical or generally cylindrical configuration. Reference is made to FIGS. 2B, 2C, 3B, 3C, 5B, 5C, 6B, 6C, 7B, and 7C. The body 20 of the illustrated extrusion device 10 has a generally cylindrical opening in which the spool 150 is mounted. The illustrated spool 150 is mounted in the body 20 of extrusion device such that the spool has no freedom (or substantially no freedom) to move axially (i.e., up or down as shown in FIGS. 2A-3C) relative to the body 20 of the extrusion device. Thus, movement of the illustrated adjustment valve involves rotation of the spool, but no axial movement of the spool. In the embodiments illustrated, this is accomplished by mounting the spool between two caps 40, 45 anchored to the body 20 of the extrusion device 10. Alternatively, the spool can be mounted between a cap (such as cap 40) and an inwardly turned shoulder of the body 20 itself.

The illustrated lock 90 has a locked configuration and an unlocked configuration. The spool 150 is rotatable relative to the body 20 when the lock 90 is in the unlocked configuration. In contrast, the spool 150 is locked against rotation relative to the body 20 when the lock is in the locked position. The lock 90 can be, for example, a quick release pin. This is perhaps best shown in FIGS. 1A-1C, 2A, 3A, 4A, 4B, 5A, 6A, 7A, 8A, and 9. In these embodiments, to adjust the extrusion device from one output configuration to another, an operator can simply pull the quick release pin, rotate the adjustment valve to the desired operative position, and re-engage the quick release pin, thereby locking the adjustment valve against rotation relative to the body.

If so desired, the body 20 may have a cylindrical opening in which the spool is mounted, and the body may be devoid of flushing channels (e.g., of the type that extend parallel to the axis of that cylindrical opening).

The adjustment valve 50 is adapted to rotate in increments when moving from one operative position to the next. Thus, the adjustment valve 50 has a plurality of different operative positions such that each two adjacent operative positions are separated by an angular increment. If desired, each two adjacent operative positions can be separated by the same angular increment (e.g., 45 degrees). This, however, is by no means required.

In the embodiments illustrated, the adjustment valve 50 comprises a spool 150 with a generally cylindrical configuration. The spool 150 is mounted in a generally cylindrical opening of the body 20. The spool 150 has a body portion 157, which has the extrudate channels. The illustrated spool 150 has opposed first 155 and second 159 neck portions, which define opposite ends of the spool. The body portion 157, the first neck portion 155, and the second neck portion 159 preferably each have a cylindrical or generally cylindrical configuration. The two neck portions 155, 159 project from the body portion 157 and each has a smaller diameter than the body portion.

The illustrated spool 150 is mounted in a cylindrical or generally cylindrical opening of the body 20 between two caps 40, 45. The caps 40, 45 are fastened (e.g., bolted) to the body 20. A bushing 47 can optionally be provided between each cap 40, 45 and the spool 150. In the embodiments illustrated, a bushing 47 is provided on each neck portion 155, 159 of the spool 150. A trunnion 60 is fastened (e.g., bolted) to the first neck portion 155 of the spool. The illustrated trunnion 60 has a hex cap 65, which an operator can conveniently rotate using a socket, a wrench, etc.

Thus, the illustrated spool configuration has a body portion 157 and two reduced-diameter neck portions 155, 159. Each end of the body portion 157 defines a shoulder with an annular surface 158. The annular surface 158 adjacent the first neck portion 155 can have a series of openings spaced apart along a circumference of the surface. The quick release pin can be engaged selectively with any one of these openings in order to lock the spool in a desired operative position. This is perhaps best shown in FIGS. 2A, 3A, 5A, 6A, 7A, and 8D-8I. Each of these openings corresponds to a different operative position of the adjustment valve 50. Thus, as noted above, the quick release pin can be pulled out of the spool 150, thereby freeing the spool to rotate relative to the body 20. An operator can then use a socket or another suitable tool to grip the hex cap 65 on the trunnion 60 and rotate the spool 150 until the desired opening in the adjacent annular shoulder surface 158 is aligned with the pin, at which point the pin can be inserted into that opening, thereby locking the spool 150 in the desired operative position.

The spool can alternatively be configured such that there is only one neck portion (e.g., the first neck portion 155), rather than two as shown. Another option is to eliminate both neck portions 155, 159, such that the spool 150 consists of the body portion 157 and is a right circular cylinder. If so desired, the or each spool in any embodiment hereof can be devoid of (i.e., such that the spool does not house) a cartridge heater.

Each spool 150 has a plurality of extrudate channels. While the number of extrudate channels in the spool 150 will vary from embodiment to embodiment, there will typically be at least four, in many cases at least six, and in some cases at least nine, extrudate channels in the spool 150. In FIGS. 2A-3C, the spool 150 has six extrudate channels 51-56. In FIGS. 5A-7C, the spool 150 has nine extrudate channels 501-509. The particular number of extrudate channels will vary based upon the requirements of different systems. In the embodiments illustrated, each spool has at least three openings (e.g., inlets) for passage of extruded material into the spool and at least three outlets for passage of extruded material out of the spool.

The body portion 157 of each illustrated spool 150 has at least one channel that extends radially in straight line across an entire diameter of the body portion. In the embodiments illustrated, the body portion 157 of each spool 150 has at least two such diametrical through-channels. Reference is made to channels 51 and 52 in FIGS. 2A-2C, channel 55 in FIGS. 3A-3C, and channels 501, 502, and 503 in FIGS. 5A-5C. In addition to having one or more diametrical through-channels, the body portion 157 can advantageously have at least one arcuate channel, i.e., a channel extending along a curved path. Each of the spools 150 shown in FIGS. 2A-3C, 5A-7C, and 8D-8I has a body portion 157 with a plurality of arcuate channels. One or more (optionally each) of these channels may be open through an outer surface of the body portion 157 (e.g., through a cylinder surface thereof) along a desired length of the channel. In some cases, a channel of this nature is open through the outer surface of the body portion along the entire length of the channel. Reference is made to channels 53, 54, and 56 in FIGS. 2A-3C, and channels 504 and 509 in FIGS. 6A-7C. In other cases, a curved channel has a total length that includes a first length and a second length, where the channel is open through the outer surface of the body portion along the first length, while the second length of the channel extends radially through the body portion 157 of the spool 150. Reference is made to channel 51 in FIGS. 2A-3C, and channels 505, 506, 507, and 508 in FIGS. 5A-7C. In some cases, a radially extending length of a channel extends between two curved lengths of the channel. Reference is made to channels 505, 506, 507, and 508 in FIGS. 5A-7C. Furthermore, the spool 150 can optionally include at least one channel having a first length extending straight across the diameter of the body portion 157 and one or two lengths that each extend axially in a straight line. Reference is made to channel 55 in FIGS. 3A-3C.

Thus, the body portion 157 of the spool 150 can have a plurality of diametrical through-channels as well as a plurality of curved channels, which can optionally be open along an outer surface of the body portion (e.g., through a cylinder surface thereof).

In the embodiments illustrated, each extrudate channel extends between an entrance port 51a, 52a, 53a, 54a, 55a, 56a, 501a, 502a, 503a, 504a, 505a, 506a, 507a, 508a, 509a, which receives a flow of polymer into the spool 150, and an exit port 51b, 52b, 53b, 54b, 55b, 56b, 501b, 502b, 503b, 504b, 505b, 506b, 507b, 508b, 509b, from which the same flow of polymer exits the spool. Thus, when a desired extrudate channel is in an active position (i.e., when it is positioned to receive extrudate flow), a flow path extends from an intake conduit of the body 20, through the desired extrudate channel in the spool 150, and into an output conduit of the body 20.

Referring to FIGS. 1C, 2A, 3A, 4B, 5A, 6A, 7A, 8A, and 8D-8I, the illustrated extrusion device 10 has three output conduits 210, 220, 230 or 410, 420, 430 passing through the body 20 generally parallel to a machine direction (see arrow A in FIG. 8A) of the extrusion device. These output conduits are configured to deliver extrudate out of the extrusion device 10. The adjustment valve 50 is rotatable, relative to the body 20, about a rotation axis perpendicular to the machine direction A of the illustrated extrusion device 10.

Thus, the illustrated extrusion device 10 has three flow lines each extending through the body 20 and through the adjustment valve 50. The body 20 and the adjustment valve 50 preferably are configured such that, during rotation of the adjustment valve 50 from the first operative position to the second operative position, all three of the flow lines always remain open. In other embodiments, the extrusion device has only two flow lines. When the adjustment valve rotates from one operative position to another, the path (or "route") of each flow line changes, and a slight pressure increase may occur, but the flow lines will never be closed entirely.

Referring now to the embodiment of FIGS. 2A-3C, the body 20 of the extrusion device 10 has first 110, second 120, and third 130 intake conduits as well as first 210, second 220, and third 230 output conduits. The adjustment valve 50 has first 51, second 52, third 53, fourth 54, fifth 55, and sixth 56 extrudate channels. When the adjustment valve 50 is in the first operative position, the first intake conduit 110 is in fluid communication with the first extrudate channel 51 and the first output conduit 210, while the second intake conduit 120 is in fluid communication with the second extrudate channel 52 and the second output conduit 220, and while the third intake conduit 130 is in fluid communication with the third extrudate channel 53 and the third output conduit 230. When the adjustment valve 50 is in the second operative position, the first intake conduit 110 is in fluid communication with the fourth extrudate channel 54 and the third output conduit 230, while the second intake conduit 120 is in fluid communication with the fourth extrudate channel 55 and the second output conduit 220, and while the third intake conduit 130 is in fluid communication with the sixth extrudate channel 56 and the first output conduit 210.

With continued reference to the embodiment of FIGS. 2A-3C, the body 20 and the adjustment valve 50 are configured such that at all times during rotation of the adjustment valve between the first and second operative positions: (i) the first intake conduit 110 is in fluid communication with the first extrudate channel 51, the fourth extrudate channel 54, or both, (ii) the second intake conduit 120 is in fluid communication with the second extrudate channel 52, the fifth extrudate channel (55), or both, and (iii) the third intake conduit 130 is in fluid communication with the third extrudate channel 53, the sixth extrudate channel 56, or both. Preferably, during rotation of the adjustment valve 50 from the first operative position to the second operative position: (a) the first intake conduit 110 is initially open only to the first extrudate channel 51, then is open to both the first extrudate channel 51 and the fourth extrudate channel 54, and finally is open only to the fourth extrudate channel 54, (b) the second intake conduit 120 is initially open only to the second extrudate channel 52, then is open to both the second extrudate channel 52 and the fifth extrudate channel 55, and finally is open only to the fifth extrudate channel 55, and (c) the third intake conduit 130 is initially open only to the third extrudate channel 53, then is open to both the third extrudate channel 53 and the sixth extrudate channel 56, and finally is open only to the sixth extrudate channel 56.

In the embodiment of FIGS. 5A-7C, the adjustment valve 50 is rotatable between first, second, and third operative positions. Thus, the extrusion device 10 in this embodiment is configured to produce: a first layer arrangement when the adjustment valve 50 is in a first operative position, a second layer arrangement when the adjustment valve 50 is in the second operative position, and a third layer arrangement when the adjustment valve 50 is in the third operative position. The first, second, and third layer arrangements are different. In one example, the first layer arrangement is a 1/2/3 layer arrangement, while the second layer arrangement is a 1/3/2 layer arrangement, and the third layer arrangement is a 2/1/3 layer arrangement. In another example, the first layer arrangement is a 1/2/1 layer arrangement, while the second layer arrangement is a 1/1/2 layer arrangement, and the third layer arrangement is a 2/1/1 layer arrangement.

With continued reference to FIGS. 5A-7C, the body 20 of the extrusion device 10 has a plurality of intake conduits 310, 320, 330 and a plurality of output conduits 410, 420, 430. The adjustment valve 50 has first, second, and third sets of extrudate channels 501, 502, 503 and 504, 505, 506 and 507, 508, 509. When the adjustment valve 50 is in the first operative position, the first set of extrudate channels 501, 502, 503 is open to the intake conduits 310, 320, 330 and to the output conduits 410, 420, 430, while the second and third sets of extrudate channels 504, 505, 506 and 507, 508, 509 are closed off from the intake conduits and from the output conduits. When the adjustment valve 50 is in the second operative position, the second set of extrudate channels 504, 505, 506 is open to the intake conduits 310, 320, 330 and to the output conduits 410, 420, 430, while the first and third sets of extrudate channels 501, 502, 503 and 507, 508, 509 are closed off from the intake conduits and from the output conduits. When the adjustment valve 50 is in the third operative position, the third set of extrudate channels 507, 508, 509 is open to the intake conduits 310, 320, 330 and to the output conduits 410, 420, 430, while the first and second sets of extrudate channels 501, 502, 503 and 504, 505, 506 are closed off from the intake conduits and from the output conduits.

In FIGS. 5A-7C, the body 20 of the extrusion device 10 has first 310, second 320, and third 330 intake conduits as well as first 410, second 420, and third 430 output conduits. In this embodiment, the adjustment valve 50 has first 501, second 502, third 503, fourth 504, fifth 505, sixth 506, seventh 507, eighth 508, and ninth 509 extrudate channels. When the adjustment valve 50 is in the first operative position, the first intake conduit 310 is in fluid communication with the first extrudate channel 501 and the first output conduit 410, while the second intake conduit 320 is in fluid communication with the second extrudate channel 502 and the second output conduit 420, and while the third intake conduit 330 is in fluid communication with the third extrudate channel 503 and the third output conduit 430. When the adjustment valve 50 is in the second operative position, the first intake conduit 310 is in fluid communication with the fourth extrudate channel 504 and the first output conduit 410, while the second intake conduit 320 is in fluid communication with the fifth extrudate channel 505 and the third output conduit 430, and while the third intake conduit 330 is in fluid communication with the sixth extrudate channel 506 and the second output conduit 420. When the adjustment valve 50 is in the third operative position, the first intake conduit 310 is in fluid communication with the seventh extrudate channel 507 and the second output conduit 420, while the second intake conduit 320 is in fluid communication with the eighth extrudate channel 508 and the first output conduit 410, and while the third intake conduit 330 is in fluid communication with the ninth extrudate channel 509 and the third output conduit 430.

In the two embodiments shown respectfully in FIGS. 8A-8I and FIGS. 9-10, the extrusion device 10 further includes a second adjustment valve 50'. In these embodiments, the second adjustment valve 50' is rotatable between first, second, and third operative positions. The two adjustment valves 50, 50' can comprise two spools each optionally being cylindrical or generally cylindrical and configured such that their two respective cylinder axes are parallel to each other. The second adjustment valve is downstream of the first adjustment valve. The extrusion device 10 is configured to produce different layer arrangements when the second adjustment valve 50' is in the first operative position than when the second adjustment valve is in the second or third operative position. The second adjustment valve 50' can be of the nature described above relative to the first adjustment valve 50. In FIGS. 8A-10, the extrusion device 10 has three flow lines, each extending through the body 20 and through both of the adjustment valves 50, 50'. In the present embodiments, the extrusion device 10 has six different output configurations (or "settings"), each characterized by a unique combination of the first adjustment valve 50 being in the first or second position while the second adjustment valve 50' is in the first, second, or third position. Thus, the extrusion device 10 is adapted to produce six different layer arrangements.

For purposes of illustration, the adjustment valve/spool design from FIGS. 1A-3C is used for the first adjustment valve 50 in the embodiment of FIGS. 8A-8I, and the adjustment valve/spool design from FIGS. 4A-7C is used for the second adjustment valve 50' in the embodiment of FIGS. 8A-8I. It is to be appreciated, however, that for other embodiments involving two or more adjustment valves, many other valve/spool designs can be used.

FIG. 8D shows the extrusion device 10 in a first output configuration (or "first setting"). When the extrusion device 10 is in this output configuration, the resulting layer arrangement can be an A/B/C layer structure. Thus, the first spool 150 is shown in an "ABC" operative position, while the second spool 150 is shown in a "123" operative position.

FIG. 8E shows the extrusion device 10 in a second output configuration (or "second setting"). When the extrusion device 10 is in this output configuration, the resulting layer arrangement can be a B/A/C layer structure. Thus, the first spool 150 is shown in an "ABC" operative position, while the second spool 150 is shown in a "132" operative position.

FIG. 8F shows the extrusion device 10 in a third output configuration (or "third setting"). When the extrusion device 10 is in this output configuration, the resulting layer arrangement can be a B/A/C layer structure. Thus, the first spool 150 is shown in an "ABC" operative position, while the second spool 150 is shown in a "213" operative position.

FIG. 8G shows the extrusion device 10 in a fourth output configuration (or "fourth setting"). When the extrusion device 10 is in this output configuration, the resulting layer arrangement can be a C/B/A layer structure. Thus, the first spool 150 is shown in a "CBA" operative position, while the second spool 150 is shown in a "123" operative position.

FIG. 8H shows the extrusion device 10 in a fifth output configuration (or "fifth setting"). When the extrusion device 10 is in this output configuration, the resulting layer arrangement can be a C/A/B layer structure. Thus, the first spool 150 is shown in a "CBA" operative position, while the second spool 150 is shown in a "132" operative position.

FIG. 8I shows the extrusion device 10 in a sixth output configuration (or "sixth setting"). When the extrusion device 10 is in this output configuration, the resulting layer arrangement can be a B/C/A layer structure. Thus, the first spool 150 is shown in a "CBA" operative position, while the second spool 150 is shown in a "213" operative position.

In the embodiment of FIGS. 9 and 10, the extrusion device 10 is a coextrusion feedblock. This can be the case in any embodiment of the present disclosure. Thus, downstream from the adjustment valve(s), the extrusion device 10 can have a flow-combining region where multiple flow lines passing through the extrusion device converge and are joined to form a single outflow conduit 300. In the illustrated embodiment, the feedblock has a single central outflow conduit 300 and two coextrusion conduits 200. The two coextrusion conduits 200 converge with each other and ultimately intersect with the outflow conduit 300.

The configuration of the outflow conduit 300 can be varied to suit different applications. In FIGS. 9 and 10, a single central outflow conduit 300 extends along a straight path located in the middle of the feedblock. This, however, is not required. For example, the central outflow conduit need not be located at the middle of the feedblock. Instead, it may be closer to the top or bottom of the feedblock. The central outflow conduit may be curved or angled, although it will generally be desirable to minimize the flow resistance in the conduit. Moreover, in some cases, layers from one or more coextrusion conduits 200 are applied to one side, but not both sides, of the core layer delivered from the central outflow conduit. In such cases, one or more coextrusion conduits are located on one side of the central outflow conduit 300, but not on the other side.

In FIGS. 9 and 10, the feedblock has a single outflow conduit 300 and two coextrusion conduits 200. A feedblock of this nature will commonly be used to produce a 3-layer coextrusion structure. Skilled artisans will appreciate, however, that a single or double-layer coextrusion structure can be produced with such a feedblock. This can be done, for example, by not using and closing one or both of the coextrusion conduits 200. More generally, the number and arrangement of coextrusion conduits 200 can be varied to accommodate many different applications. The feedblock, for example, can alternatively have a single coextrusion conduit. As another example, when a 5-layer coextrusion structure is desired, the feedblock will typically have at least four coextrusion conduits. Many other variants of this nature will be apparent to skilled artisans given the present teaching as a guide.

In FIGS. 9 and 10, each coextrusion conduit 200 opens into the outflow conduit 300, such that the secondary extrudate flow in each coextrusion conduit merges with the extrudate flow in the outflow conduit, thus producing a multi-layer extrudate flow. The layer delivered from the central flow is referred to as the core layer. One or more layers from the coextrusion conduit(s) are layered onto the core layer. The resulting multi-layer extrudate flow moves along the outflow conduit 300 until reaching the outlet 309. From the outlet 309, the multi-layer extrudate flow may be delivered to an extrusion die or another downstream tool, such as a layer multiplier or another feedblock.

The body 20 of the feedblock shown in FIGS. 9 and 10 can optionally comprise four blocks 20' joined together. The illustrated central outflow conduit 300, for example, can extend along a path located at an interface of two such blocks 20', which collectively surround, and are each exposed to, the central conduit. In other cases, two such blocks can be replaced by a single block defining both halves of this portion of the feedblock. The illustrated feedblock also has an output plate 590, although this is not required.

The feedblock shown in FIGS. 9 and 10 has two flow adjusters 700. In other embodiments, there may be only one flow adjuster, four or more flow adjusters, or none. When provided, each flow adjuster 700 preferably is rotatable and wedge shaped. Each flow adjuster 700 may be rotatable about a rotation axis that is perpendicular or generally perpendicular to the rotation axis/axes of the/each adjustment valve 50, 50'. In the illustrated embodiment, each flow adjuster 700 is rotatable to simultaneously change: i) the gap height of the adjacent coextrusion conduit 200, and ii) a height of the central outflow conduit 300. Thus, the flow adjuster(s) 700 is/are downstream from the adjustment valve(s) 50, 50'.

The illustrated flow adjusters 700 each have first and second flow-contacting surfaces. The first flow-contacting surface 758 is exposed to the central outflow conduit 300, and the second flow-contacting surface 752 is exposed to the coextrusion conduit 200. The second flow-contacting surface 752 preferably has a concave configuration.

Each illustrated flow adjuster 700 has a cylindrical base region from which projects a wedge region that narrows with increasing distance from the cylindrical base region until reaching a tip where the extrudate flows from the central outflow conduit 300 and the respective coextrusion conduit 200 intersect. This is shown in FIG. 10, which illustrates a flow-combining region of the feedblock where two coextrusion conduits 200 merge with the central outflow conduit 300. Each coextrusion conduit 200 has an outlet that opens into the central outflow conduit 300. Thus, the illustrated feedblock 500 has a flow-combining region where multiple extrudate flows are combined to form a multi-layer extrudate flow. In FIG. 10, the height of the central outflow conduit 300 at a location entering the flow-combining region is set by the separation distance between the confronting pair of adjustable flow adjusters 700.

In the embodiment of FIG. 10, the feedblock has gauges 800 that indicate the position of the respective adjustable wedge-shaped flow controller 700. The illustrated gauges are merely exemplary; various different gauge types can be used. Moreover, the gauges are optional and may be omitted in some cases.

Thus, the feedblock shown in FIGS. 9 and 10 has two coextrusion conduits 200 and two flow adjusters 700. The configuration, functionality, and other features of these coextrusion conduits 200 and flow adjusters 700 (including any actuators) can optionally be of the nature described in U.S. patent application Ser. No. 13/646,206, the entire teachings of which are incorporated herein by reference. In other embodiments, the feedblock can have one or more viscosity compensation devices of the type disclosed in U.S. patent application Ser. No. 14/445,604. More generally, depending upon the applications intended for the feedblock, it can have any suitable viscosity compensation system or layer profiling devices, or none at all.

Another embodiment of the invention provides a method of using an extrusion device 10 to produce different layer arrangements. The extrusion device 10 has a body 20 and an adjustment valve 50. The method involves operating the extrusion device 10, while the adjustment valve 50 is in a first operative position, to produce a first layer arrangement. The adjustment valve 50 is then rotated from the first operative position to a second operative position, and the extrusion device 10 is operated (while the adjustment valve is in the second operative position) to produce a second layer arrangement. As noted above, the first and second layer arrangements are different.

The method may include delivering first, second, and third polymer flows respectively to first, second, and third inputs 118, 128, 138 of the body 20 continuously during rotation of the adjustment valve 50 from the first operative position to the second operative position (as well as during any other rotation of the/each adjustment valve from one operative position to another). Since the output configuration of the extrusion device 10 can be changed without having to shut down the extrusion line, the extruder(s) delivering polymer flows to the device can continue operating while the layer arrangement produced by the device is changed.

The illustrated adjustment valve 10 is rotated from the first operative position to the second operative position without removing any component of the extrusion device 10 and replacing such component with a different component. It is unnecessary, for example, to remove and replace flow inserts, diverters, plugs, flow spools, and/or selector plates before adjusting the extrusion device 10 from one output configuration to another. More generally, the extrusion device 10 can optionally be adjustable between different output configurations without disassembling any portion of the extrusion device (or at least any portion exposed to extrudate flow).

The rotational adjustment method of the present invention provides exceptional dynamic sealing. It also enables a particularly compact device profile. In the embodiments illustrated, rotation of the adjustment valve 50 is relative to the body 20 and about a rotation axis perpendicular to a machine direction (see arrow A in FIG. 8A) of the extrusion device 10.

The illustrated extrusion device 10 has three flow lines each extending through the body 20 and through the adjustment valve (50). During rotation of the adjustment valve 50, all three of these flow lines always remain open. This is also the case for each flow line in embodiments having fewer (only two) or more than three flow lines. When the adjustment valve rotates from one operative position to another, the path (or "route") of each flow line changes, and while a slight pressure increase may occur, the flow lines will never be closed entirely.

When the adjustment valve 50 is in the first operative position, a first set of extrudate channels 51, 52, 53 or 501, 502, 503 in the adjustment valve 50 is open to a plurality of intake conduits 110, 120, 130 or 310, 320, 330 and a plurality of output conduits 210, 220, 230 or 410, 420, 430 in the body 20, while a second set of extrudate channels 54, 55, 56 or 504, 505, 506 in the adjustment valve is closed off (and thus receives no flow) from the intake conduits and from the output conduits. When the adjustment valve 50 is in the second operative position, the second set of extrudate channels 54, 55, 56 or 504, 505, 506 is open to the intake conduits 110, 120, 130 or 310, 320, 330 and to the output conduits 210, 220, 230 or 410, 420, 430, while the first set of extrudate channels 51, 52, 53 or 501, 502, 503 is closed off (i.e., receives no flow) from the intake conduits and from the output conduits. It can thus be understood that methods of using the illustrated system may involve flowing extrude sequentially through "n" intake conduits of the body 20, then through "n" (not more) active extrudate channels of the or each adjustment valve, and then through "n" output conduits of the body. As will be appreciated, such methods do not involve flowing extrudate through closed extrudate channels of the or each adjustment valve, and need not involve flowing extrudate through any flushing channels while flow is being delivered to the active extrudate channels.

As noted above, some embodiments involve an adjustment valve 50 that is rotatable between first, second, and third operative positions. In such cases, the method further involves rotating the adjustment valve 50 from the second operative position to a third operative position, and operating the extrusion device 10 (while the adjustment valve is in the third operative position) to produce a third layer arrangement. The first, second, and third layer arrangements are different. When the adjustment valve 50 is in the third operative position, a third set of extrudate channels 507, 508, 509 in the adjustment valve 50 is open to the intake conduits 110, 120, 130 or 310, 320, 330 and to the output conduits 210, 220, 230 or 410, 420, 430, while the first and second sets of extrudate channels 501, 502, 503 and 504, 505, 506 are closed off from the intake conduits and from the output conduits. It is to be appreciated that, depending upon the intended applications, the adjustment valve 50 may have four or more operative positions. Thus, the present method may involve rotating the adjustment valve 50 among four or more operative positions.

The coextrusion device 10 used in the present method can be a feedblock of the nature described above with reference to FIGS. 9 and 10. Thus, the present method can involve extruding a first flow of extrudate through a central output conduit 300 while simultaneously extruding at least a second flow of extrudate through a coextrusion conduit 200. In many cases, the method involves extruding the first extrudate flow through the central output conduit 300 while simultaneously extruding two other extrudate flows respectfully through two coextrusion conduits 200. Thus, the first flow and the second flow(s) preferably are combined, at an intersection of the output conduit 300 and the coextrusion conduit(s) 200, to produce a multi-layer extrudate flow.

As noted above, the feedblock of FIGS. 9 and 10 has two flow adjusters 700, which preferably are each rotatable and wedge shaped. Thus, the present method can optionally involve rotating the flow adjusters 700 to simultaneously adjust the gap height of each coextrusion conduit 200 and a height of the central output conduit 300.

While preferred embodiments of the invention have been described, it should be understood that various changes, adaptations and modifications may be made therein without departing from the spirit of the invention and the scope of the appended claims.

What is claimed is:

1. An extrusion device, comprising:
   a body having a plurality of intake conduits and a plurality of output conduits; and
   an adjustment valve having first and second sets of extrudate channels, said adjustment valve being rotatable between a) a first operative position, where said first set of extrudate channels is open to said intake conduits and to said output conduits while said second set of extrudate channels is closed off from said intake conduits and from said output conduits, and b) a second operative position, where said second set of extrudate channels is open to said intake conduits and to said output conduits while said first set of extrudate channels is closed off from said intake conduits and from said output conduits, such that said extrusion device is configured to produce a first layer arrangement when said adjustment valve is in said first operative position, and said extrusion device is configured to produce a second layer arrangement when said adjustment valve is in said second operative position,
   wherein said first and second layer arrangements are different.

2. The extrusion device of claim 1, wherein:
   said body has first, second, and third inputs to respectively receive first, second, and third polymer flows,
   said adjustment valve is rotatable between said first and second operative positions while the first, second, and third polymer flows are delivered to said first, second, and third inputs of said body,
   said extrusion device has three flow lines each extending through said body and through said adjustment valve, and
   said body and said adjustment valve are configured such that, during rotation of said adjustment valve between said first and second operative positions, all three of said flow lines remain open.

3. The extrusion device of claim 1, wherein:
   said body has first, second, and third intake conduits that comprise said plurality of intake conduits and first, second, and third output conduits that comprise said plurality of output conduits, said adjustment valve has first, second, and third extrudate channels that comprise said first set of extrudate channels, as well as fourth, fifth, and sixth extrudate channels that comprise said second set of extrudate channels, when said adjustment valve is in said first operative position, said first intake conduit is in fluid communication with said first extrudate channel and said first output conduit while said second intake conduit is in fluid communication with said second extrudate channel and said second output conduit and while said third intake conduit is in fluid communication with said third extrudate channel and said third output conduit, when said adjustment valve is in said second operative position, said first intake conduit is in fluid communication with said fourth extrudate channel and said third output conduit while said second intake conduit is in fluid communication with said fifth extrudate channel and said second output conduit and while said third intake conduit is in fluid communication with said sixth extrudate channel and said first output conduit, and said body and said adjustment valve are configured such that during rotation of said adjustment valve from said first operative position to said second operative position:
  (a) said first intake conduit is initially open only to said first extrudate channel, then is open to both said first extrudate channel and said fourth extrudate channel, and finally is open only to said fourth extrudate channel,
  (b) said second intake conduit is initially open only to said second extrudate channel, then is open to both said second extrudate channel and said fifth extrudate channel, and finally is open only to said fifth extrudate channel, and
  (c) said third intake conduit is initially open only to said third extrudate channel, then is open to both said third extrudate channel and said sixth extrudate channel, and finally is open only to said sixth extrudate channel.

4. The extrusion device of claim 1, wherein:
said adjustment valve is rotatable between first, second, and third operative positions,
said extrusion device is configured to produce the first layer arrangement when said adjustment valve is in said first operative position,
said extrusion device is configured to produce the second layer arrangement when said adjustment valve is in said second operative position,
said extrusion device is configured to produce a third layer arrangement when said adjustment valve is in a third operative position,
said first, second, and third layer arrangements are different,
said adjustment valve further comprises a third set of extrudate channels,
when said adjustment valve is in said first operative position, said first set of extrudate channels is open to said intake conduits and to said output conduits while said second and third sets of extrudate channels are closed off from said intake conduits and from said output conduits,
when said adjustment valve is in said second operative position, said second set of extrudate channels is open to said intake conduits and to said output conduits while said first and third sets of extrudate channels are closed off from said intake conduits and from said output conduits, and
when said adjustment valve is in said third operative position, said third set of extrudate channels is open to said intake conduits and to said output conduits while said first and second sets of extrudate channels are closed off from said intake conduits and from said output conduits.

5. The extrusion device of claim 1, wherein:
said adjustment valve comprises a spool and a lock,
said lock has a locked configuration and an unlocked configuration,
said body has a generally cylindrical opening in which said spool is mounted,
said spool is rotatable relative to said body when said lock is in said unlocked configuration, and
said spool is locked against rotation relative to said body when said lock is in said locked configuration.

6. The extrusion device of claim 1, wherein the adjustment valve is a first adjustment valve, the extrusion device further comprising:
a second adjustment valve rotatable between first, second, and third operative positions,
said extrusion device is configured to produce different layer arrangements when said second adjustment valve is in said first operative position than when said second adjustment valve is in said second or third operative position,
said extrusion device has three flow lines each extending through said body and through both of said adjustment valves, and
said extrusion device has six different settings each characterized by a unique combination of said first adjustment valve being in said first or second operative position while said second adjustment valve is in said first, second, or third operative position, such that said extrusion device is adapted to produce six different layer arrangements.

7. A method of producing different layer arrangements using an extrusion device comprising a body having a plurality of intake conduits and a plurality of output conduits and an adjustment valve having first and second sets of extrudate channels, the method comprising:
operating said extrusion device, while said adjustment valve is in a first operative position, to produce a first layer arrangement, wherein in said first operative position said first set of extrudate channels is open to said intake conduits and to said output conduits while said second set of extrudate channels is closed off from said intake conduits and from said output conduits,
rotating said adjustment valve from said first operative position to a second operative position, and
operating said extrusion device, while said adjustment valve is in said second operative position, to produce a second layer arrangement, wherein in said second operative position said second set of extrudate channels is open to said intake conduits and to said output conduits while said first set of extrudate channels is closed off from said intake conduits and from said output conduits,
wherein said first and second layer arrangements are different.

8. The method of claim 7, further comprising:
delivering first, second, and third polymer flows respectively to first, second, and third inputs of said body continuously throughout said rotation of said adjustment valve from said first operative position to said second operative position.

9. The method of claim 7, further comprising:
rotating said adjustment valve from said second operative position to a third operative position, and
operating said extrusion device, while said adjustment valve is in said third operative position, to produce a third layer arrangement,
said first, second, and third layer arrangements being different.

10. The method of claim 9, wherein when said adjustment valve is in said third operative position, a third set of extrudate channels in said adjustment valve is open to said intake conduits and to said output conduits while said first and second sets of extrudate channels are closed off from said intake conduits and from said output conduits.

11. The method of claim 7, further comprising:
rotating a second adjustment valve between first, second, and third operative positions, and
operating said extrusion device to produce different layer arrangements when said second adjustment valve is in said first operative position than when said second adjustment valve is in said second or third operative position.

* * * * *